Patented July 28, 1936

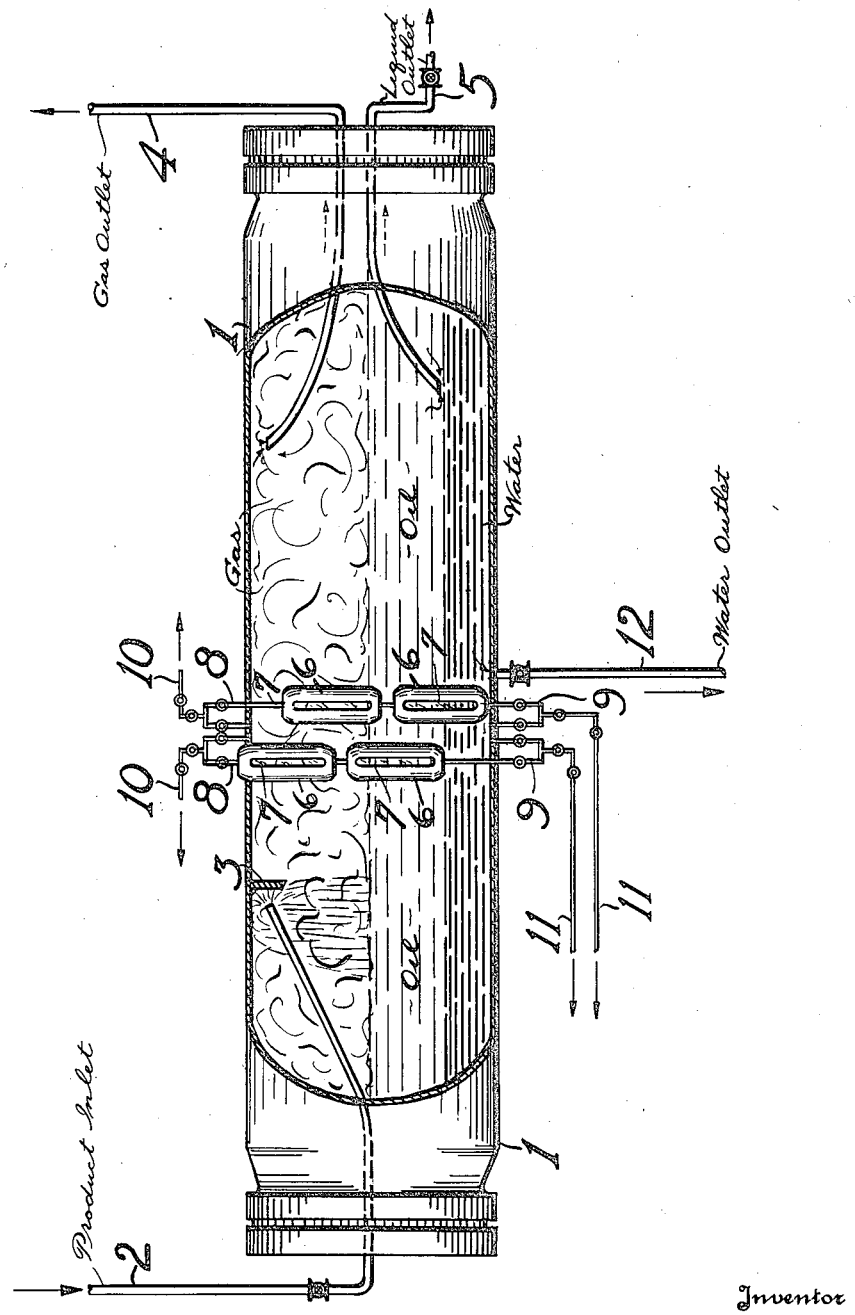

2,049,068

UNITED STATES PATENT OFFICE 2,049,068

OIL AND GAS SEPARATOR

Bernard A. Loupe, Baton Rouge, La., assignor to Standard Oil Development Company Application April 16, 1931, Serial No. 530,478

1 Claim. (Cl. 73—54)

My invention relates to an improved means for securing a separation of gaseous and liquid materials and more especially to the separation of gases and liquids under elevated pressure in the product from the high pressure hydrogenation of carbonaceous materials.

In removing the products from a high pressure hydrogenation system it is usually desirable after cooling to separate the liquid and gaseous fraction and to recycle the gas for further use without substantial loss in pressure. High pressure separators of various types have been proposed for this purpose, one of which is shown in the drawing attached, but it is understood that this invention is not limited to this particular type of separator. In oil-gas separators operating under pressure the use of mechanical level indicators or gauge glasses of ordinary types such as are used on open tanks or low pressure boilers is usually not practical and recourse must be had to special indicating means. Metal boxes or cylinders containing slits fitted with heavy glass, reinforced by metal in a manner sufficient to safely withstand the internal pressure without leakage, are one type of level indicator which has been found suitable for this use. Other indicators or sight glasses are considered equivalents for the purpose of this invention if they are situated outside the pressure retaining walls of the separator and are connected thereto by gas and liquid balancing lines.

It is the object of this invention to provide a separation apparatus and an improved method of operating the same so that no substantial deposit of non-liquid material occurs in the separator, the connecting lines between the level indicator and the separator vessel remain clear of obstructions during operation and the indicator responds accurately to changes in level within the separator vessel.

My invention will be understood from the drawing which shows a sectional elevation of the separator with a level indicator connected thereto.

Referring to the drawing, a mixed gas and liquid product cooled below the condensation temperature of water, but not below 32° F., is admitted to high pressure vessel 1 through line 2, against a baffle 3. Gas is withdrawn from the vessel by line 4 and liquid by line 5. Level indicators 6 having glass slits 7 let into the sides of metal boxes or cylinders are connected by lines 8 to the top and by lines 9 to the bottom of separator 1. Lines 10 and 11 are blow-out lines for the top and bottom connecting lines respectively. The connecting lines are suitably valved so that either line may be blown in either direction without interrupting the operation of the separator. Two sets of level indicators having independent connections to the separator are shown in the drawing and are desirable so that one set may always be in use while the other is being repaired or blown out. It is understood that any additional number of indicators may be used as found desirable. In my improved method of operation only one indicator may generally be used safely. The connecting lines while shown running to the top and bottom of the separator may also be attached through the heads of the separator or at any other desired points provided lines 9 are connected at a point below the offtake of line 5 and lines 8 are connected at a point above the gas-liquid interface. Drain line 12 is attached to the bottom of the separator for the purpose of completely draining some of liquid when desired. This line is preferably shut off during operation for reasons stated below.

I have found that in the operation of my improved apparatus with hydrogenated products the liquid phase separates generally into two layers containing oil and water respectively and that an oil emulsion of solid and semi-solid matter is retained at the oil-water interface. The water in the product may result from water originally in the oil being hydrogenated or from the conversion of oxides of carbon in the feed oil or gas to the system or from other sources. It is desirable in operating with stocks which do not have sufficient water in the product to commence the operation with the separator partially filled with water. The indicator connecting lines are then filled with water at the start of the process or any oil contained therein may be blown out and replaced with water as soon as sufficient water has accumulated in the bottom of the separator. The water accumulates in the separator up to the point of offtake of the liquid product release line 5 and then both oil and water are withdrawn from this line in the same proportions in which they enter the separator.

It has been customary heretofore to operate separators of this type either with the offtake of the product release line at the bottom of the separator or with a constant water drain through the water draw-off line to prevent accumulation of water within the separator.

I have found that in such operation a thick emulsion-like layer of foreign matter tends to deposit on the bottom of the separator. This layer may consist of oil wetted catalyst, dust, scale, heavy asphaltic materials, coke, powdered coal, ash, or other matter, depending upon the type of the process from which the product is obtained. This deposit enters the liquid connecting lines to the level indicators and causes the latter to become sluggish and to give false readings. The lines may even become so completely plugged that the indicators are rendered inoperable. It is, therefore, necessary in this type of operation to blow out the bottom lines repeatedly. This results not only in a waste of material to the sewer but the plugging has been found to become so bad under certain types of operation that even repeated blowing out of the lines is not satisfactory and the level indicators become practically useless. The deposit may also accumulate to such an extent that the product release line may become plugged.

I have found that the deposit of scale, catalyst dust, ash, heavy asphaltic or coky materials and the like appear to be preferentially wetted by the oil or at all events, the material as it is in a finely divided condition is held in the oil layer or in the oil-water interface. The result is that such foreign matter is withdrawn with the oil and does not settle to the bottom of the separator. In other words, the bottom and the offtake lines for the level indicators are completely sealed from contact with these materials.

I have found that the liquid connecting line becomes plugged very rarely, accurate level indication is constantly maintained, and it is necessary to blow out the liquid lines as a precautionary measure only about once a week. Operating under similar conditions without my invention it was necessary to blow out the liquid lines as often as ten times a day.

It is understood that while I have described one particular application of my invention to a separator vessel having external level indicators, my invention is not to be limited thereto, but that it applies to all cases in which oil-water mixtures are to be separated from gases, whether or not level indicators are attached to the separator vessel.

My invention applies to the operation of separators at pressures below or above atmospheric and temperatures at which liquid water and oil phases exit in contact with a gaseous phase under the conditions of operation.

My invention is not to be limited by any theory of the mechanism of the operation nor to any specific means for its accomplishment nor to any details given in any example for illustrative purposes, but only by the following claim in which I wish to claim all novelty inherent in my invention.

I claim:

In an oil and gas separator in which the body of oil, containing water emulsion and oil insoluble particles and a layer of water below the oil is confined under constant, greater than atmospheric pressure of the gas separated therefrom, an improved indicator for determining the upper and lower levels of the oil body comprising in combination visual indicating means located exteriorly of the separator, a valved pipe for withdrawing water from below the oil body and a valved pipe for withdrawing gas from above the oil body to the indicating means, and a means for maintaining the layer of water below the oil body at a substantially constant, predetermined level whereby a clear external indication of both the upper and lower levels is obtained at the indicating means, consisting of a pipe extending downwardly into spaced relationship with the bottom of the container and adapted for removal of the liquid contents of the separator in quantities proportional to the introduction thereof.

BERNARD A. LOUPE.